No. 813,858. PATENTED FEB. 27, 1906.
E. K. CARTER.
MACHINE FOR CUTTING BUTTER, &c.
APPLICATION FILED AUG. 5, 1905.
3 SHEETS—SHEET 1.
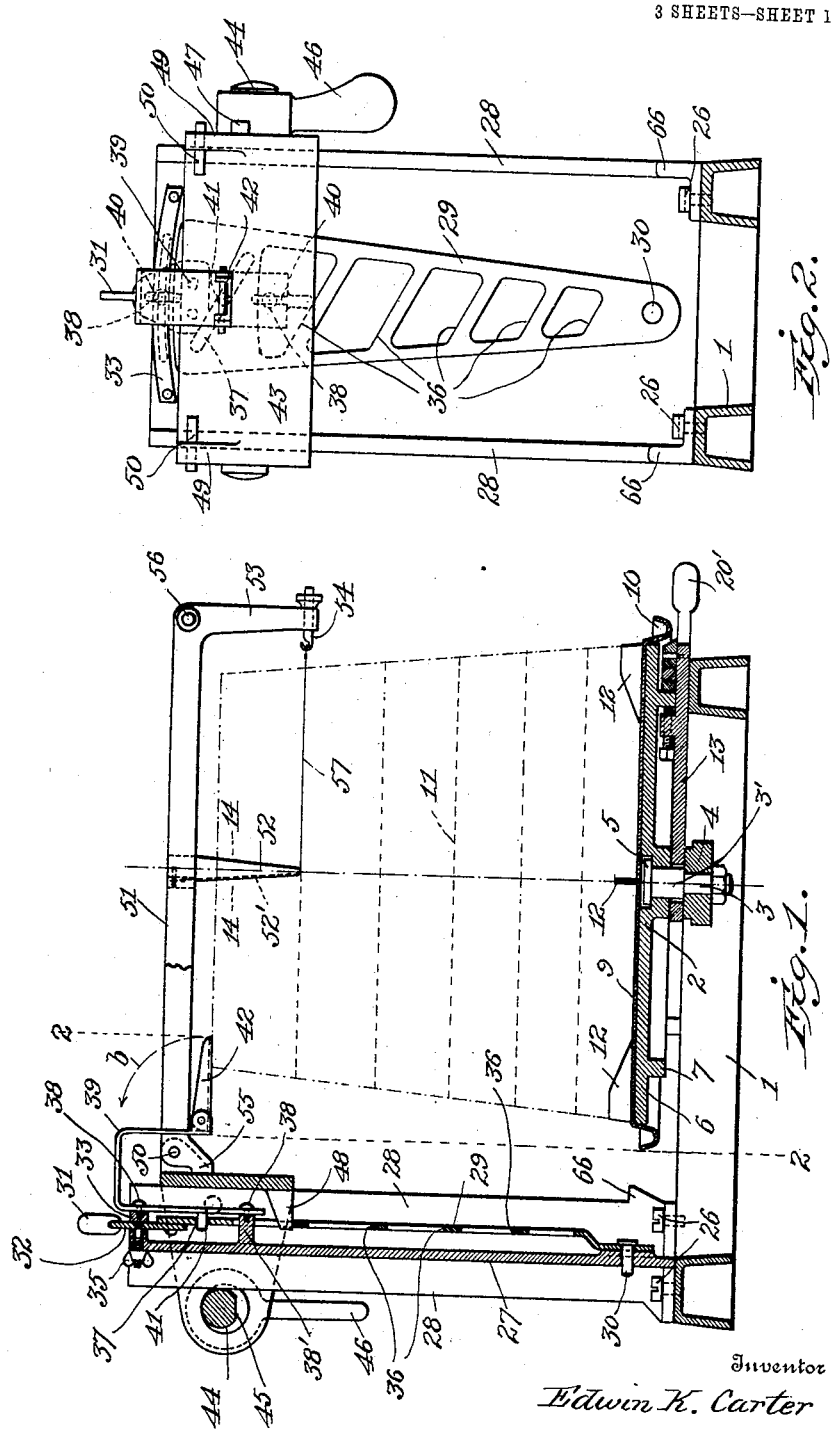
Witnesses
Edwin L. Yewell
C. D. Davis
Inventor
Edwin K. Carter
By W. Schomborn
Attorney

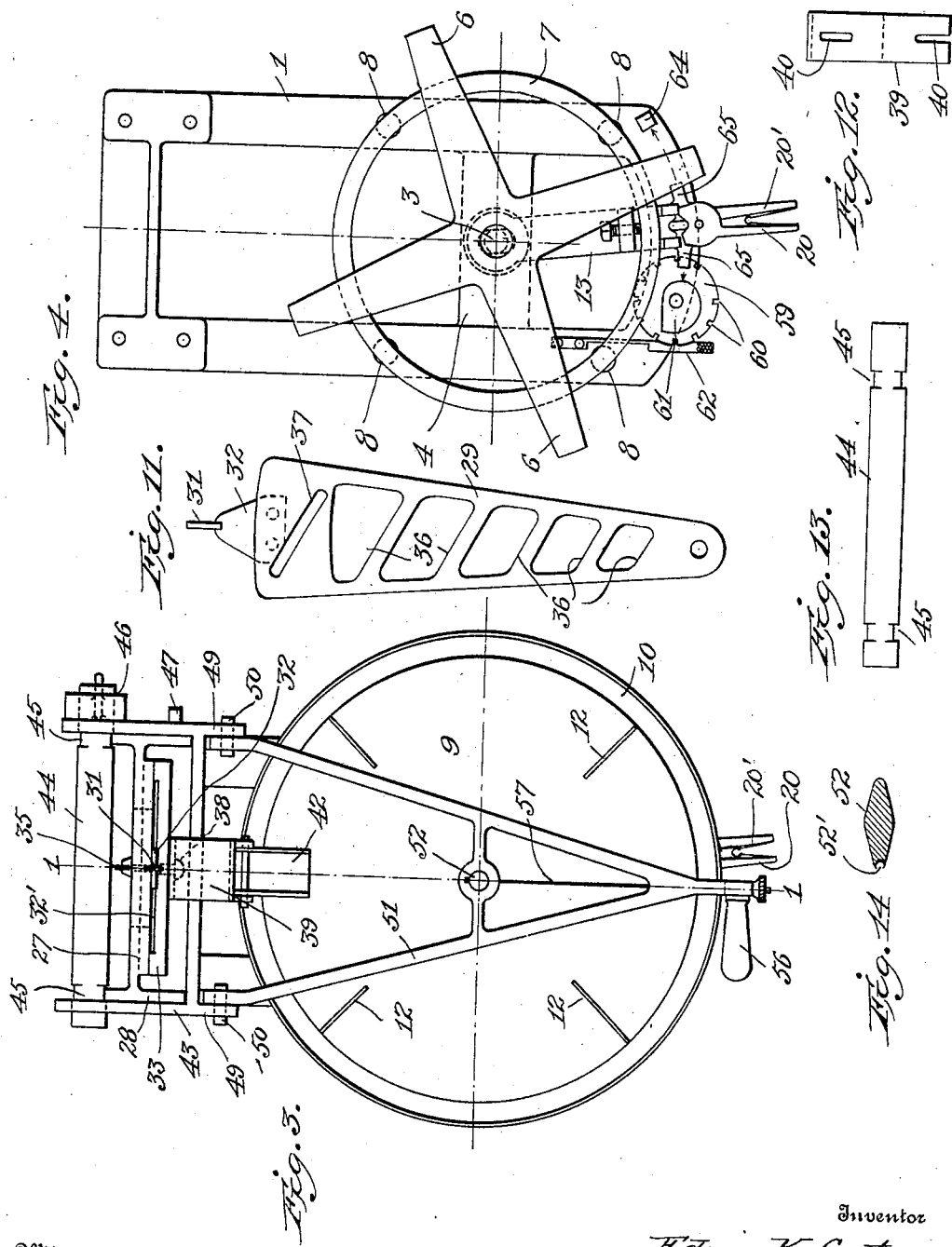

No. 813,858. PATENTED FEB. 27, 1906.
E. K. CARTER.
MACHINE FOR CUTTING BUTTER, &c.
APPLICATION FILED AUG. 5, 1905.
3 SHEETS—SHEET 3.
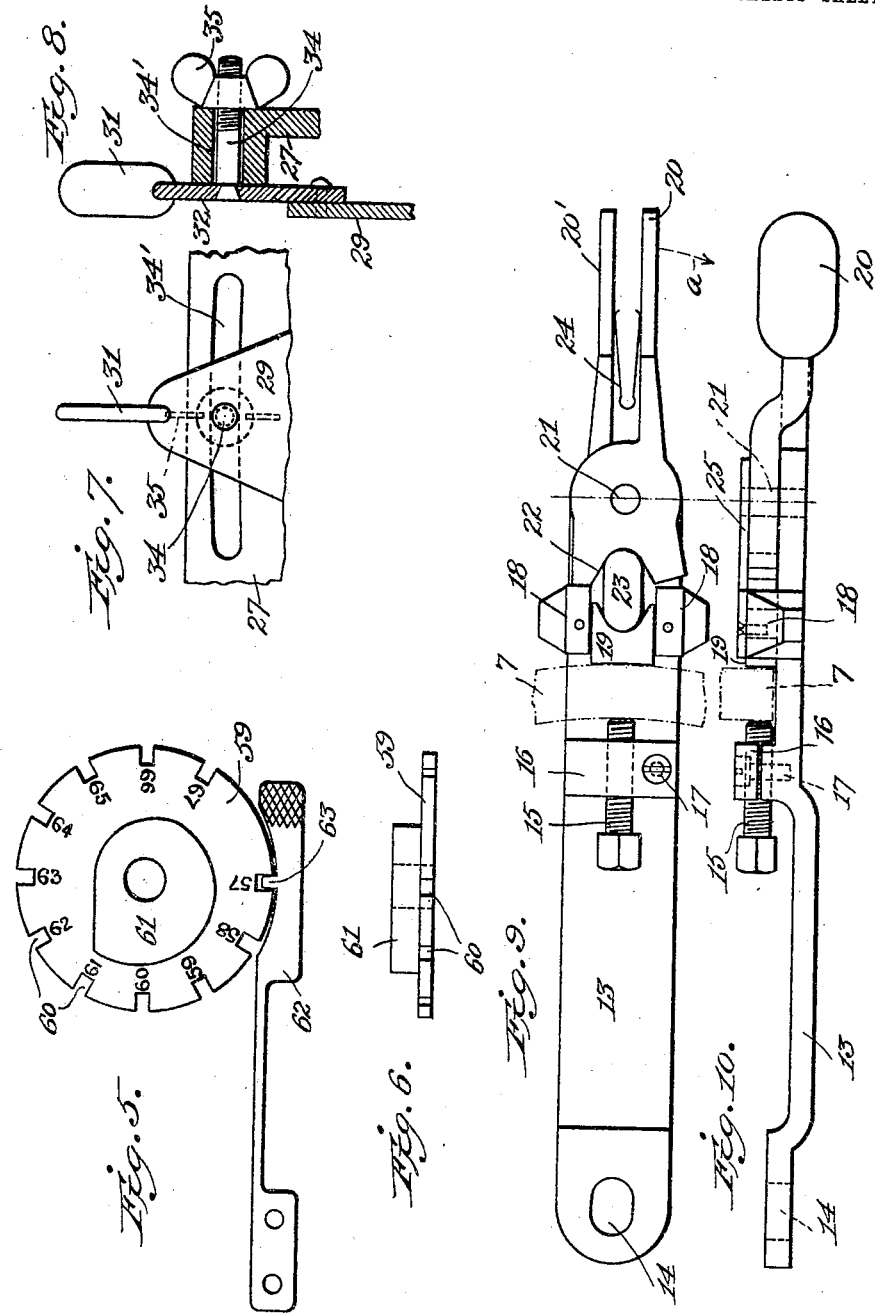
Witnesses
Edwin L. Yewell
C. W. Davis
Inventor
Edwin K. Carter
By W. G. Schrenborn
Attorney

UNITED STATES PATENT OFFICE.

EDWIN K. CARTER, OF NEW YORK, N. Y., ASSIGNOR TO THE KUTTOWAIT BUTTER CUTTER COMPANY, A CORPORATION OF NEW JERSEY.

MACHINE FOR CUTTING BUTTER, &c.

No. 813,858.           Specification of Letters Patent.           Patented Feb. 27, 1906.

Application filed August 5, 1905. Serial No. 272,893.

*To all whom it may concern:*

Be it known that I, EDWIN K. CARTER, a subject of the King of Great Britain and Ireland, residing at New York, in the county and State of New York, have invented certain new and useful Improvements in Machines for Cutting Butter or the Like Material, of which the following is a specification.

My invention relates to machines adapted to successively sever by the production of horizontal and vertical slits blocks of butter of predetermined weight or volume from cakes frusto-conical in shape and of variable height and weight as obtained from the tub used in packing and shipping butter.

The objects of my invention are, first, to provide a butter-cutter which is capable of subdividing a cake of butter frusto-conical in shape into a plurality of frusto-conical blocks of varying height and of equal weight or volume; second, to provide a cutter which is able when the cake of butter frusto-conical in shape has been or is capable of being subdivided into a plurality of equal frusto-conical blocks, to further divide each of the indicated equal blocks into a series of radial segments or sections of predetermined or equal weight or volume; third, to provide means whereby the adjustments for carrying out the above-stated objects or operations are readily and accurately effected mechanically and controlled by the initial height and weight of the frustum of cone of butter; fourth, to provide an apparatus in which the above-recited objects or operations are carried out efficiently and correctly and at the same time having a minimum number of parts, durability and simplicity of construction, and a low cost of manufacture; fifth, to provide a construction of butter-cutter for the above purpose in which the operation and adjustments of the parts composing the machine are easily understood and regulated and securely held in any of their adjusted positions; sixth, to provide a construction of pan supporting the cake of butter which can be readily and securely attached to the apparatus and at the same time prevent the cake of butter from slipping thereon while being acted upon by the cutter; seventh, other evident advantages of construction which will appear from the hereinafter-detailed description of the apparatus and manner of operating the same.

My invention consists of structural features and relative arrangements of elements which will be hereinafter more fully and clearly described, and particularly pointed out in the appended claims.

Referring to the three sheets of drawings, in which similar reference characters indicate the same parts in the several figures, Figure 1 is a central section on line 1 1 of Fig. 3, showing in elevation the height-gage, the cutter and its supporting-arm, and in dotted lines a cake of butter to be operated upon. Fig. 2 is a section in line 2 2 of Fig. 1 with the cutter and its supporting-arm removed. Fig. 3 is a plan view of the machine. Fig. 4 is a plan view of the machine with the back frame or standard, cutter, and supporting-arm and pan on the turn-table removed. Fig. 5 is an enlarged plan view of the weight-gage with cam attached and latch therefor. Fig. 6 is a side view of Fig. 5 with latch removed. Fig. 7 is an enlarged and fragmentary elevation of the upper end of the dividing-plate and means for securing it in its adjusted position. Fig. 8 is a central section of Fig. 7. Fig. 9 is a detached and plan view of the clutch mechanism engaging the turn-table. Fig. 10 is a side elevation of Fig. 9 with the protecting-cover attached. Fig. 11 is an elevation of the dividing-plate detached from the machine. Fig. 12 is a rear elevation of the height-gage. Fig. 13 is a plan view of the locking-pin for the adjustable carriage. Fig. 14 is an enlarged cross-section of the cutter-supporter on line 14 14 of Fig. 1.

Referring to Figs. 1 and 2, 1 is the base-plate of the machine, which may be of any suitable shape, so as to firmly support the superposed structure of the machine, and is preferably constructed so as to combine lightness with strength.

2 is a turn-table, which is rotatably secured to the base 1 by means of a fixed bolt 3, passing through and secured to a transverse section 4 of the base 1. Said turn-table 2, as will be seen by reference to Fig. 4, consists preferably, of four radial arms 6 6, which are connected by a depending and integral circular rim 7, whose lower face rests on suitable projections 8 8 on the side sections of the base 1.

9 is a removable pan having an outer flange which is so arranged as to be able to be sprung on and engage the ends of the arms 6 6 and be firmly held to the turn-table and yet be readily removed therefrom when so desired. The extreme outer portion of the pan 9, as will be seen in Figs. 1 and 3, is turned up at its outer edge to form a circular trough 10, which is adapted to catch the water and brine flowing from the cake of butter 11, placed thereon, as indicated in dotted lines.

12 12 are radial and thin upright ribs or ridges placed, preferably, near the periphery of the pan for the purpose of engaging the lower side of the butter cake and preventing the same from slipping or turning when acted upon by the cutter to be hereinafter described.

The bolt 3, around which rotates the turn-table, is provided at its middle section with a shoulder 3' to rest on the upper side of the section 4 of the base 1 and has at its upper end an enlargement 5, which is adapted to be seated in a seat or depression in the middle of the turn-table, as shown in Fig. 1, thus providing a neat, firm, and protected center-bearing for the rotary pan or platform.

13 is a lever which is provided at one of its ends, preferably, with an elongated slot 14, (see Figs. 9 and 10,) through which the center bolt 3 passes. Said lever 13 is placed between the under side of the turn-table 2 and the upper side of the base 1 and is provided near its outer end with a clutch mechanism adapted to engage the depending rim 7 on the lower side of the turn-table. Said clutch (see Figs. 9 and 10) consists of an adjustable screw 15, which passes through a lug 16, having a saw-cut, whose opening may be adjusted by a small screw 17. The point of the adjusting-screw 15 bears against the inner side of the depending rim 7.

18 18 are side lugs which form a pocket or guide for the steel block 19, said block having a straight or slightly-curved surface on the side engaging the rim 7 and a V-shaped cut in its opposite side.

20 is a spring-pressed handle pivoted to the outer end of the lever 13 by a pin 21 and is provided at its inner end with an enlarged end having a V-shaped recess 22. Inserted between the two V-shaped sections and resting on the lever 13 is a block 23, which forces the steel block 19 against the outer side of the rim 7 when the enlarged or inner end of the handle 20 forces the block 23 against the block 19. The pivotal movement of the handle 20 is limited by the outer sides of the V-shaped section 22 by coming in contact with the side lugs 18 18. A V-shaped spring 24 tends to normally throw the handle 20 in the direction of the arrow $a$ and release the clutch, which, however, when said handle 20 is pushed against to rotate the turn-table from left to right, as will be seen by reference to Fig. 4, automatically engages the rim 7 and rotates the table 2 about its center bolt 3 and automatically releases the same when pressure is removed from the handle 20 and permits the return of the lever 13 and attached clutch to its original position without disturbing the turn-table by pressing against the outer end 20' of the lever 13.

25 is a plate suitably fastened to the lugs 18 18 for covering the space between them and retaining the blocks 19 and 23 in their operative relations.

From the foregoing description it will be seen that I have devised a compact and reliable means for positively rotating the rotary table or platform and at the same time by the elongated opening 14 in one end and the adjustable screw 15 permitting the same to be readily regulated or adjusted to take up wear and insure a positive engagement of the clutch with the turn-table.

While I have shown one way of effecting a positive rotation of the turn-table, there are many other ways this may be effected, and I wish it to be distinctly understood the above arrangement is not one of the absolutely essential and necessary features of the present invention.

To one side of the base 1 and rigidly secured thereto by screws 26 26 or other means is an upright and stiff frame or standard 27, which is provided with outside flanges 28 28, which combine stiffness and strength with lightness of the structure and form a guide for the carriage, to be presently described.

29 (see Figs. 1, 2, and 11) is the dividing-plate, preferably triangular in shape and pivoted at one end near the bottom of the frame or standard 28 by means of a pin 30.

31 is a grip or handle projecting over the upper end of the standard 27 and is connected by means of a thin strip of metal 32, which is suitably secured to the upper end of the dividing-plate and which is adapted to slide in an elongated slot 32', (see Fig. 3,) formed between the upper end of the frame or standard 27 and a strip 33, suitably fastened thereto.

34 (see Figs. 7 and 8) is a thin rod connected to the strip 32 and passing through an arc-shaped slot 34' in the upper end of the frame 27. Said rod 34 is screw-threaded at its outer end, which is engaged by a thumb-screw 35, and enables the dividing-plate 29 to be securely locked or clamped to the standard 27 in any adjusted position when rocked on its lowest pivot point or pin 30.

36 36 are a series of properly determined and spaced height edges within the dividing-plate 29 and which are formed by cutting out sections of the plate, as indicated. The edges 26 26 are the loci of the different heights or distances which the cutter is placed above the plane of turn-table in order to cut the different heights of frusto-conical cakes of butter into suitable layers—as shown in the present instance into six superposed layers or frustums of cones of equal weight or cubical contents.

At the upper end of the dividing-plate 29 is provided an inclined slot 37. (See Figs. 1 and 2.) Attached near the upper portion of the frame 27 and in vertical alinement are two small screws 38 38, the upper one of which is fastened to the strip 33 and the lower to a projection 38' of the frame 27. The heads of the screws are slightly separated from the plane of the metal securing them.

39 (see Figs. 1, 2, and 12) is an inverted-U-shaped piece of thin and stiff sheet metal forming the height-gage and is provided with an upper and a lower elongated slot 40 adjacent to the upper portion of the dividing-plate 29 and registering with the screws 38 38. The piece 39 is provided also on its side toward the dividing-plate with a small pin 41, projecting into the inclined slot 37 at the upper end of dividing-plate 29. At the other or free end of the U-shaped piece 39 is provided a horizontal extension or finger 42, which is preferably hinged and can be turned up and out of the way, as indicated by the dotted arrow $b$.

From the foregoing arrangement and construction of parts just described it will be readily understood that when the dividing-plate 29 is rocked its slot 37 and pin 41, connected with the piece 39, cause the same to move up or down between the screws 38 38 and frame 27 and guided by the slots 40 40, thus enabling the finger or extension 42 to be vertically adjusted by means of handle 31 and securely held in contact with the upper surface of the cake of butter (shown in dotted lines) by tightening up screw 35 for the purpose to be later explained.

43 is a U-shaped casting forming a carriage which is independent of the dividing-plate 29 and height-gage 39 and is slidingly fitted to the outside of the outer flanges 28 28 of the standard or frame 27 and is adapted to be moved up and down and locked at certain points to the said standard 27. The locking device (see Fig. 13) for this sliding carriage 43 consists of a round and eccentrically-placed locking-rod 44, which passes through and has suitable bearings in the outer or back ends of the U-shaped carriage. The section of the rod 44 which bears against the outer side of each of the flanges 28 28 is partially cut away at 45, as shown in Figs. 1, 3, and 13, so that when said rod 44 is turned by means of a handle 46 the cut-out sections may be made to assume a horizontal position, thus locking the carriage to the standard. If the cut-out sections 45 45 are turned in a vertical position, the projection 48 on the lower side of carriage 43, to be presently described, is able to be freed and the carriage 43 may be slid up and down on the standard and guided by the flanges 28 28 on both sides.

47 is a stop to indicate when the handle 46 and locking-rod 44 have been turned sufficiently to permit the carriage 43 to be adjusted.

At the center of the side of the U-shaped carriage 43 toward and parallel with the dividing-plate 29 is fastened or made integral therewith a projection 48, whose lower edge is adapted to rest on the edges 36 36 of the dividing-plate 29 in the different adjusted positions of the carriage and cutter to be presently described.

On one side and at each end of the U-shaped carriage 43 is provided an extension 49, to which is pivoted or hinged, by means of pins 50, a triangular-shaped arm 51. (See Figs. 1 and 3.)

52 is a combined knife and wire supporting means secured at right angles to the plane of the triangular arm and at a point directly over the center of the turn-table 2 when the plane of said arm is lowered into a position parallel with the plane of the table. The outer end or apex of the triangular arm is provided with a depending extension 53, the lower end of which is provided with an adjustable hook 54 for tightening the cutter-wire.

57 is a cutting-wire having one end secured to the upper portion of the wire-supporting means 52 and is passed downward and seated or held in a small groove 52' in one side of the support 52, then turned horizontally, and has its other end, which is provided with an eye, engaged by the adjustable hook 54.

The pivoted or inner ends of the arm 51 are provided with stops 55, which abut against the outer side of the carriage 43 and support the arm in its proper and horizontal position.

56 is a handle attached to the free or outer end of the arm 51, supporting the cutter and enables the operator to raise the cutter or depress the cutting edge of the same into the cake of butter into the position as indicated in Fig. 1.

From the above-described construction and arrangement of arm and cutter it will be seen that I have provided a means which can be readily manipulated, is self-adjusting, and at the same time easily raised or placed free of the path of the cake of butter while being placed on the turn-table in charging the machine.

59 is the weight-gage, (see Figs. 4, 5, and 6,) rotatably secured to the front and near one side of the base 1, and consists of a circular disk having a series of circumferential slots or notches 60, which indicate the adjustments for different weights of the cakes of butter in the tubs and in the present case is graduated for tubs weighing from fifty-seven to sixty-seven pounds, which I have found to be the extreme weight limits of the cakes of butter, and, if so desired, a half-pound graduation could be interposed between the indicated notches.

61 is a cam attached to the upper side of the weight-gage and having its outer edge curved to gradually-increasing radii to properly and accurately control the starting-point for the lever 13 and clutch mechanism which engages the rim 7 of the turn-table for variably rotating the cake of butter.

62 is a spring-latch having one of its faces concaved and provided with a pointed section 63 for engaging the weight-indicating slots or notches 60.

64 is a fixed stop firmly held on the other side of the base from that of the weight-gage 59 and controls the extreme movement of the actuating-lever 13 and clutch mechanism to the right or away from the weight-gage.

65 65 are extensions or lugs on the turn-table-operating lever 13, one of which abuts against the cam 61 on the weight-gage and the other against the stop 64.

66 66 are stops at the lower end of the standard on which may be rested the carriage when the cutter is used to slit or cut vertically the last sections of the cake, and they also indicate points with which to gage whether the pan or turn-table is properly adjusted.

The operation of the machine is as follows: The cover having been removed from the tub of butter the pan 9 is detached from its supporting-arms 6 of the turn-table 2 and is placed centrally with respect to the circular opening of the closed tub and with its radial ribs 12 toward the butter. Then said ribs are forced into the butter, whereby the pan 9 is securely held to the same. The tub of butter with attached pan is then placed on a scale and the shipping-tub is then removed, leaving the cake of butter of frusto-conical shape on the pan. Knowing the invariable weight of pan, the exact weight of the cake of butter can be properly determined. Having determined the weight of the tub-cake, the weight-gage 59 is set by having the point 63 engage such a notch 60, which corresponds with the above-determined weight of the cake. The hinged supporting-arm 51, with its cutter and the pivoted extension 42 of the height-gage 39, are turned up, so as to have entirely free the space above the turn-table 2, and thereby enable one to easily place and properly fasten the pan with its superposed cake of butter on the rotary table. The pivoted dividing-plate 29 by means of its handle 31 is rocked back and forth several times to see that the projection 48 on the carriage and other parts of the cutter are entirely free and permit an unobstructed movement to the said plate 29. After the hinged extension 42 of the height-gage 39 is turned down into a horizontal position the dividing-plate is rocked or adjusted by means of the pin-and-slot connections, as heretofore described, until the under side of the extension 42 is brought in contact with the upper side of the cake of butter, as indicated in Fig. 1, and by turning up the nut of the tightening-screw 35 the dividing-plate is firmly and immovably secured to the standard 27 in its adjusted position. Through this adjustment of the dividing-plate its series of inclined edges 36 36 have been made to assume such relation that the points which would be cut on these edges 36 36 by a vertical plane passing through the center of the pivot-pin 30, cutter or wire 57, and the center of rotation of the turn-table are the loci of horizontal planes which will divide the cake of butter frusto-conical in shape and resting on the pan of the turn-table into a plurality or as many equal sections as there are edges 36 plus one. Having now determined these horizontal cutting planes, as above described, the movable carriage 43, sliding up and down on the outer flanges 28 of the standard 27, is unlocked by means of properly turning the handle 46, and so adjusted until its projection 48 rests on the upper one of the series of edges 36. The projection 48 has been so positioned and fastened on the carriage 43 that its center and the point or end of the knife or cutter supporting means 52 and cutting-wire 57 when in the position indicated in Fig. 1 are in the same horizontal and vertical planes, and hence will coincide with the same plane which divides or separates the first equal section from the others in the cake. After the carriage and cutter-bar have been properly adjusted, as above indicated, and locked to the standard 27 by means of the locking rod or bar 44 and the extension 42 raised the lug 65 of the clutching mechanism is brought into contact with the stop 64. The cutter-supporting bar 51 is brought downwardly and the knife-edge (see Fig. 14) of the cutter-supporting means 52 and the wire 57 are forced down into and through the cake of butter until they assume the position as indicated in Fig. 1. The cake of butter may then be rotated against the cutting-wire 57 by means of the clutch mechanism and lever 13 until the whole upper section has been severed and returned to the point of starting, or the cake of butter may be rotated only through an arc to which the weight-gage 58 is set to permit the clutch mechanism or lever to swing in order to cut one pound, or, if so desired, it may be rotated one-half the distance for a half-pound. After the base or platform has been turned through the arc for the desired one or several pounds, the cutter-supporting bar is raised and a section of the upper frustum layer is cut in the shape of a radial segment, either in one or a number of points, depending upon the number of times the clutch mechanism was reciprocated. After the upper layer has been removed the carriage 43 is unlocked, as heretofore explained, and the projection 48 is brought down to the next edge 36 below and the carriage again locked, and the operation of cutting or slicing the next layer is repeated. These operations are repeated until all of the cake has been subdivided, the lower layer only requiring the vertical slits to be made while the carriage rests on the stops 66. While I prefer to first entirely cut or sever a complete section before subdividing such section into its radial segments, yet with this machine, as will be seen from the foregoing-described construction and operation, each radial segment of one or more pounds could be cut off and leave the rest of the cake intact.

From the foregoing disclosure it will be seen that I have described a cutter which effects all the functions and objects as recited in the statement of invention, and while I have described one and my preferred form it can be readily seen and understood by those skilled in the art that many changes will be readily suggested without departing from the spirit of my invention. Furthermore, I do not care to limit myself to this exact form of cake of material or manner of subdividing the same into a number of superposed layers of equal weight—as, for example, instead of the original cake of butter or other material being of frusto-conical shape or subdividing it into six equal sections the machine may be applied, without departing from the spirit of my invention as herein disclosed, to a cake having any regular shape of base and of uniformly-varying cross-section and divided into any number of equal and superposed sections, depending upon the contour and number of the edges on the dividing-plate, or it may also be readily seen that if the edges in the dividing-plate are so arranged or properly spaced relative to each other the machine can be made or adapted to cut a cake of butter or other material of cylindrical or barrel shape, or, in fact, any regular shape whose horizontal cross-section is approximately circular or other regular geometric figure.

Having now fully described my invention, what I claim as new, and desire to secure by Letters Patent, is—

1. A machine for cutting butter or the like material comprising a base, a cutter adjustable with respect to the base, and means for determining the adjusted positions or distances between the base and cutter, whereby cakes of butter or like material substantially frusto-conical in shape and of variable height and weight resting on said base are capable of being divided or cut into a plurality of sections, the several sections of the same cake being substantially of the same weight and volume.

2. A machine for cutting butter or like material comprising a base, a cutter adjustable with respect to the base, and means for determining the adjusted positions or distances between the base and cutter, whereby cakes of butter or like material of uniformly-varying cross-section and of variable height and weight resting on said base are capable of being divided or cut into a plurality of sections, the several sections of the same cake being substantially of the same weight and volume.

3. A machine for cutting butter or like material comprising a rotary base, a cutter adjustable with respect to the base and means for determining the adjusted positions or distances between the base and cutter, whereby cakes of butter or like material of uniformly-varying cross-section and of variable height and weight resting on said base are capable of being divided or cut into a plurality of sections, the several sections of the same cake being substantially of the same weight or volume.

4. A machine for cutting butter or like material comprising a base, a cutter adjustable with respect to the base, means for determining the adjusted positions or distances between the base and cutter, whereby a cake of butter or the like material of uniformly-varying cross-section and resting on said base is capable of being divided or cut into a plurality of sections of the same weight or volume, and means for subdividing each of the above sections of equal weight or volume into a plurality of radial segments or sections of predetermined weight or volume.

5. A machine for cutting butter or like material comprising a rotary platform, a cutter adjustable to and from the platform, and means for regulating the adjusted distances between the cutter and platform, whereby a cake of butter or like material of substantially frusto-conical shape and resting on said platform is divided up into a plurality of superposed sections of substantially the same weight or volume.

6. A machine for cutting butter or like material comprising a movable platform, a cutter adjustable to and from the platform, means for regulating the distances between the platform and cutter whereby a cake of butter or like material of substantially frusto-conical shape resting on said platform is divided up into a plurality of equal sections, and means for moving said platform.

7. A machine for cutting butter or the like material comprising a rotary platform, a cutter vertically and variably adjustable with respect to the platform, means for regulating the adjustments between the platform and cutter whereby a cake of butter of uniformly-variable cross-section and resting on said platform is capable of being divided up into a plurality of superposed layers or sections of substantially the same weight or volume and means for regulating the rotation of said platform to determinately cut into segments each of the superposed layers.

8. A machine for cutting butter or the like material comprising a rotary platform, a cutter-supporting means vertically and variably adjustable with respect to the platform, means for locking said cutter-supporting means in its adjusted position, a cutter hinged to said cutter-supporting means and moving independently in a plane at right angles to the platform, and means for regulating the adjustments between the cutter-supporting means and the platform whereby a cake of butter is capable of being divided up into a plurality of sections of equal weight or volume and adjustable means for regulating the rotation of said platform to determinately cut into segments each of the sections.

9. A machine for cutting butter or the like material comprising a rotary platform, a cutter adjustable to and from the platform, and means for determining the variable distances between the cutter and platform whereby a block of butter or like material, substantially a frustum of cone in shape, and resting on said platform, is capable of being divided horizontally into a plurality of sections of the same weight or volume.

10. A machine for cutting butter or the like material comprising a rotary platform, a cutter variably adjustable to and from the platform, means for determining the variable distances between the cutter and platform whereby a block of butter or the like material resting on said platform and of substantially frusto-conical shape is capable of being divided horizontally into a plurality of sections of different height each being substantially the same weight or cubical contents, and means for rotating said platform through a predetermined and variable angle.

11. A machine for cutting butter or the like, comprising a platform, a cutter variably adjustable to and from the platform, and means for regulating the variable distances between the cutter and platform whereby a cake of butter or the like of variable height resting on said platform and of substantially frusto-conical shape is capable of being divided up into a plurality of sections of frusto-conical shape and different heights, and each section having the same weight or cubical contents.

12. A machine for cutting butter or the like comprising a rotary platform, a cutter having mountings adjustable to variable distances to and from the platform and having an independent movement in a plane at right angles to the plane of the platform, adjustable means for determining the variable distances between the cutter and platform whereby cakes of butter or the like of different heights resting on said platform and of substantially frusto-conical shape are capable of being divided up into a plurality of sections of frusto-conical shape and of different heights and each of the several sections of the same cake having substantially the same weight and volume, and means for rotating said platform through predetermined and variable angles to divide each of the sections into radial segments of predetermined weight or volume.

13. A machine for cutting butter or the like material comprising a base, a platform rotatably supported on said base, means for regulating the arc of rotation of said platform, a standard rigidly connected to the base, an adjustable dividing-plate pivotally supported to the standard and having a plurality of properly-spaced height-indicating edges between its pivot-point and upper end, means for locking the dividing-plate to the standard, an adjustable height-gage engaging the dividing-plate and controlling the adjusted or locked position of the said plate, an adjustable carriage constructed to move up and down on the standard and adapted to rest on the height edges of the dividing-plate in its different adjusted positions, and a cutter pivotally connected to said adjustable carriage and moving in a plane at right angles to the plane of the platform.

14. A machine for cutting butter or the like material comprising a base, a turn-table rotatably supported on said base and provided with a depending rim, a clutch mechanism for intermittently engaging the rim, an adjustable means for controlling the movement of the clutch mechanism and rotation of the turn-table, a standard rigidly connected to the base, an adjustable dividing-plate pivotally supported to the standard and having a plurality of properly determined and spaced height-indicating edges between its pivot-point and upper end, means for locking the dividing-plate to the standard, an adjustable height-gage engaging the dividing-plate and controlling the adjusted or locked position of the said plate, an adjustable carriage constructed to move up and down on the platform and adapted to rest on the height edges of the dividing-plate in its adjusted positions, and a cutter pivotally connected to the adjustable carriage and moving in a plane at right angles to the plane of the turn-table.

15. A machine for cutting butter or the like material comprising a base, a turn-table rotatably supported on said base, a pan resting on said turn-table and having a peripheral flange adapted to engage the same, means for rotating said turn-table, and means for operatively supporting a cutter above said turn-table.

16. A machine for cutting butter or like material comprising a base, a cutter adjustable with respect to the base, and means for determining the adjusted positions or distances between the base and cutter, whereby cakes of butter or like material of variable height and uniformly-varying cross-section resting on said base are capable of being divided or cut into a plurality of sections, the several sections of the same cake being substantially of the same weight and volume.

17. A machine for cutting butter or like material comprising a rotary base, a cutter adjustable with respect to the base and means for determining the adjusted positions or distances between the base and cutter, whereby cakes of butter or like material of variable height and uniformly-varying cross-section resting on said base are capable of being divided or cut into a plurality of sections, the several sections of the same cake being substantially of the same weight or volume.

18. A machine for cutting butter or like material comprising a base, a cutter adjustable with respect to the base, means for determining the adjusted positions or distances between the base and cutter, whereby a cake of butter or the like material resting on said base is capable of being divided or cut into a plurality of sections of the same weight or volume, and means for subdividing each of the above sections of equal weight or volume into a plurality of radial segments or sections of predetermined weight or volume.

19. A machine for cutting butter or the like material comprising a base, a turn-table rotatably supported on said base, a pan resting on said turn-table and having a peripheral flange adapted to engage the same, the outer edges of the flange being turned up to form a circular trough around the edge of the pan, and means for operatively supporting a cutter above said turn-table.

20. A butter-cutter comprising a rotary platform for holding a cake of butter, a vertical standard at the side of said platform, a vertically-extending dividing-plate pivoted near the bottom of said standard on a horizontal pivot, said dividing-plate being provided with a series of height-measuring edges having a predetermined relation to the platform, a height-gage vertically adjustable on the upper end of the standard, coöperating means between the pivoted dividing-plate and the height-gage whereby upon movement of the dividing-plate the height-gage is moved up or down, a vertically-movable carriage on the standard, a cutter secured to the carriage, and means for fixing the position of the carriage and cutter by coöperation with the height-measuring edges.

21. A butter-cutter comprising a rotary platform for holding a cake of butter, a vertical standard at the side of said platform, a vertically-extending dividing-plate pivoted near the bottom of said standard on a horizontal pivot, said dividing-plate being provided with a series of height-measuring edges having a predetermined relation to the platform, a height-gage having a vertically-sliding connection with the standard, an inclined slot in the dividing-plate, a pin projecting from the height-gage and into said slot whereby the pivotal movement of the dividing-plate moves the height-gage up or down, a vertically-movable carriage on the standard, a cutter secured to the carriage, and means for fixing the position of the carriage and cutter by coöperation with the height-measuring edges.

22. A butter-cutter comprising a rotary platform for holding a cake of butter, a vertical standard at the side of said platform, a vertically-extending dividing-plate pivoted near the bottom of said standard on a horizontal pivot, said dividing-plate being provided with a series of cut-away portions providing inclined height-measuring edges, a height-gage vertically adjustable on the upper end of the standard and having an arm adapted to engage the top of the cake of butter, coöperating means between the pivoted dividing-plate and the height-gage whereby upon movement of the dividing-plate the height-gage is moved up or down, means for securing the dividing-plate in position when the arm of the height-gage has engaged the top of the cake of butter, a vertically-movable carriage on the standard, a cutter secured to the carriage, and means for fixing the position of the carriage and cutter by coöperation with the height-measuring edges.

23. A butter-cutter comprising a rotary platform for holding a cake of butter, a vertical standard at the side of said platform, a vertically-extending dividing-plate pivoted near the bottom of said standard on a horizontal pivot, said dividing-plate being provided with a series of cut-away portions providing inclined height-measuring edges, a height-gage vertically adjustable on the upper end of the standard and having an arm adapted to engage the top of the cake of butter, coöperating means between the pivoted dividing-plate and the height-gage whereby upon movement of the dividing-plate the height-gage is moved up or down, means for securing the dividing-plate in position when the arm of the height-gage has engaged the top of the cake of butter, a vertically-moving carriage, a projection on said carriage adapted to engage any one of the height-measuring edges, a cutter secured to the carriage, and means for securing the carriage to the standard in any adjusted position whereby the cutter is set in a predetermined relation to the platform.

24. A butter-cutter comprising a rotary platform for holding a cake of butter, a vertical standard at the side of said platform, a vertically-extending dividing-plate pivoted near the bottom of said standard on a horizontal pivot, said dividing-plate being provided with a series of height-measuring edges having a predetermined relation to the platform, a height-gage vertically adjustable on the upper end of the standard, coöperating means between the pivoted dividing-plate and the height-gage whereby upon movement of the dividing-plate the height-gage is moved up or down, a vertically-movable carriage on the standard, a cutter secured to the carriage, and means for fixing the position of the carriage and cutter by coöperation with the height-measuring edges, means for rotating the platform, and adjustable means for determining the arc of rotation of the platform whereby to sever from the cake of butter a predetermined volume or weight thereof.

25. A butter-cutter comprising a rotary platform for holding a cake of butter, a vertical standard at the side of said platform, a vertically-extending dividing-plate pivoted near the bottom of said standard on a horizontal pivot, said dividing-plate being provided with a series of height-measuring edges having a predetermined relation to the platform, a height-gage vertically adjustable on the upper end of the standard, coöperating means between the pivoted dividing-plate and the height-gage whereby upon movement of the dividing-plate the height-gage is moved up or down, a vertically-movable carriage on the standard, a cutter secured to the carriage, means for fixing the position of the carriage and cutter by coöperation with the height-measuring edges, a lever for rotating the platform, a stop for limiting the rotation of the platform in one direction, and an adjustable stop for limiting its movement in the opposite direction whereby to sever from the cake of butter a predetermined volume or weight thereof.

26. A butter-cutter comprising a rotary platform for holding a cake of butter, a vertical standard at the side of said platform, a vertically-extending dividing-plate pivoted near the bottom of said standard on a horizontal pivot, said dividing-plate being provided with a series of height-measuring edges having a predetermined relation to the platform, a height-gage vertically adjustable on the upper end of the standard, coöperating means between the pivoted dividing-plate and the height-gage whereby upon movement of the dividing-plate the height-gage is moved up or down, a vertically-movable carriage on the standard, a cutter secured to the carriage, means for fixing the position of the carriage and cutter by coöperation with the height-measuring edges, a lever for rotating the platform having means for engaging the platform whereby the lever when moved in one direction will move the platform but when moved in the opposite direction will move freely without disturbing the position of the platform, a fixed stop limiting the movement of the lever in one direction, a rotating graduating disk provided with a cam-stop for determining the starting-point of the lever and therefore the arc through which the platform may rotate whereby to sever from the cake of butter a predetermined volume or weight thereof.

27. In a machine for cutting butter or the like material, a base, a table supported on said base, a pan resting on said table and having a peripheral flange adapted to engage the outer edge of the table, the outer edge of the flange being turned up to form a circular trough around the edge of the pan.

28. In a machine for cutting butter or the like material, a base, a rotary table consisting of a plurality of separated radial arms and supported on said base, a pan resting on said table and having a peripheral flange adapted to engage the outer ends of the radial arms, the outer edge of the flange being turned up to form a circular trough around the edge of the pan.

29. In a machine for cutting butter or the like material, a base, a rotary table consisting of a plurality of separated radial arms and supported on said base, a pan resting on said table and having a peripheral flange adapted to engage the outer ends of the radial arms, the outer edge of the flanges being turned up to form a circular trough around the edge of the pan, and ribs or ridges on the upper side of the pan.

In testimony whereof I affix my signature in the presence of two witnesses.

EDWIN K. CARTER.

Witnesses:
  CARSON G. ARCHIBALD,
  STEWART WATSON.